(12) United States Patent
Player

(10) Patent No.: US 12,396,472 B2
(45) Date of Patent: Aug. 26, 2025

(54) HEMP DRYING PROCESS

(71) Applicant: Tyler Player, Presque Isle, ME (US)

(72) Inventor: Tyler Player, Presque Isle, ME (US)

( * ) Notice: Subject to any disclaimer, the term of this patent is extended or adjusted under 35 U.S.C. 154(b) by 896 days.

(21) Appl. No.: 17/224,190

(22) Filed: Apr. 7, 2021

(65) Prior Publication Data

US 2021/0368845 A1    Dec. 2, 2021

Related U.S. Application Data

(60) Provisional application No. 62/976,368, filed on Feb. 14, 2020.

(51) Int. Cl.
    *A23N 12/08*  (2006.01)
    *F26B 3/04*   (2006.01)
    *F26B 11/02*  (2006.01)

(52) U.S. Cl.
    CPC .............. *A23N 12/08* (2013.01); *F26B 3/04* (2013.01); *F26B 11/028* (2013.01)

(58) Field of Classification Search
    CPC ......... A23N 12/08; F26B 3/04; F26B 11/028; F26B 11/0477; A23B 7/0205; A23L 3/485
    USPC ........................................................ 34/321
    See application file for complete search history.

(56) References Cited

U.S. PATENT DOCUMENTS

| | | | | |
|---|---|---|---|---|
| 3,798,789 A | * | 3/1974 | Thompson | F26B 11/0477 432/103 |
| 3,861,055 A | * | 1/1975 | Thompson | F26B 11/0477 34/108 |
| 4,338,732 A | * | 7/1982 | Coxhill | E01C 19/1036 432/118 |
| 10,213,788 B2 | * | 2/2019 | Bates | B02C 19/16 |
| 2020/0318904 A1 | * | 10/2020 | Hawkins | F26B 3/04 |
| 2021/0190423 A1 | * | 6/2021 | DeWaard | F26B 11/026 |

FOREIGN PATENT DOCUMENTS

| | | | | |
|---|---|---|---|---|
| CN | 104341193 A | * | 2/2015 | |
| CN | 110715525 A | * | 1/2020 | |
| NZ | 529360 A | * | 8/2005 | .............. A61K 31/05 |
| WO | WO-2014125521 A1 | * | 8/2014 | .......... C02F 1/46104 |

\* cited by examiner

*Primary Examiner* — John P McCormack

(57) ABSTRACT

A method of drying hemp plants using a rotary drying system that dries the plants without damaging the cannabidiol in the plants.

6 Claims, 3 Drawing Sheets

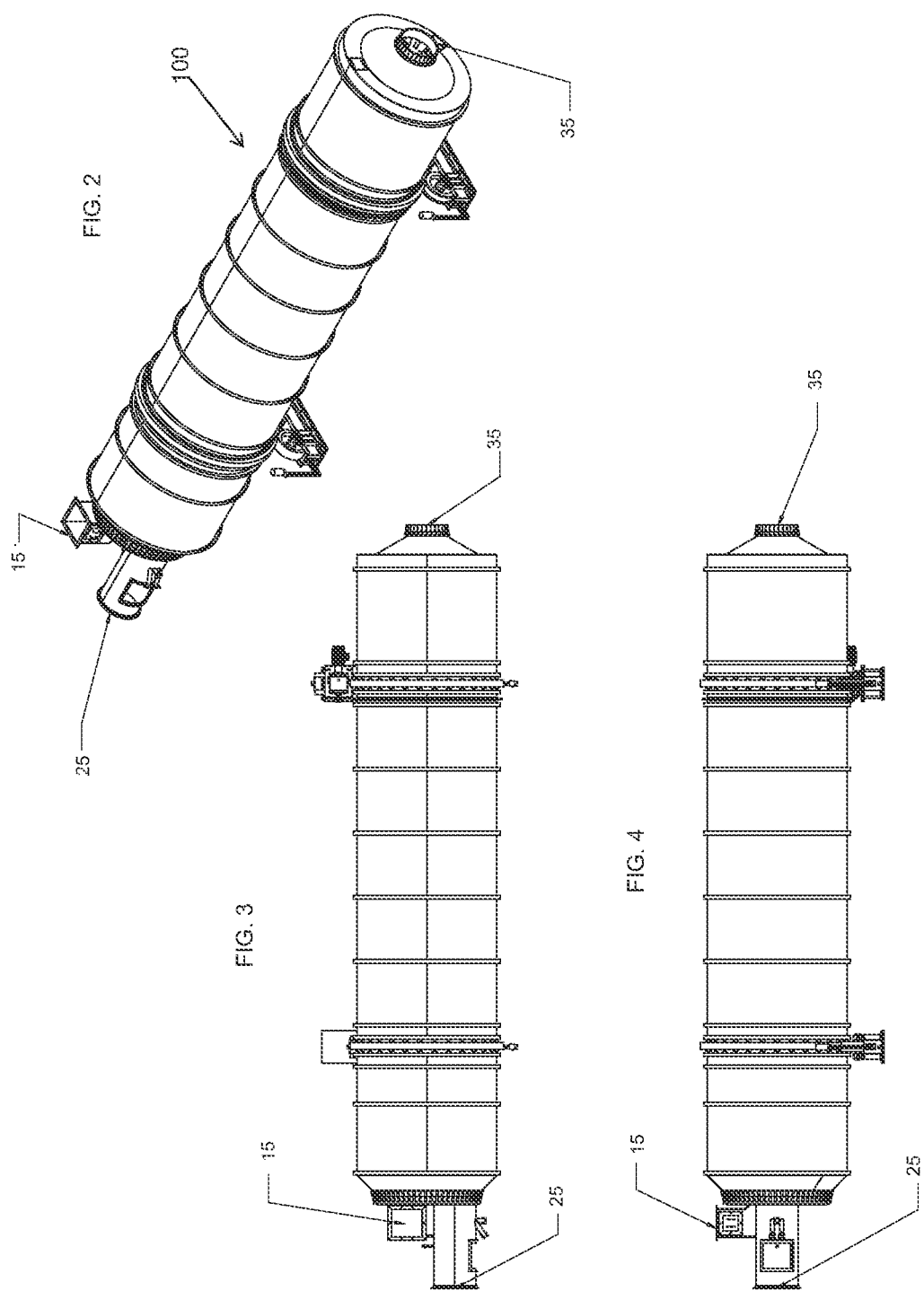

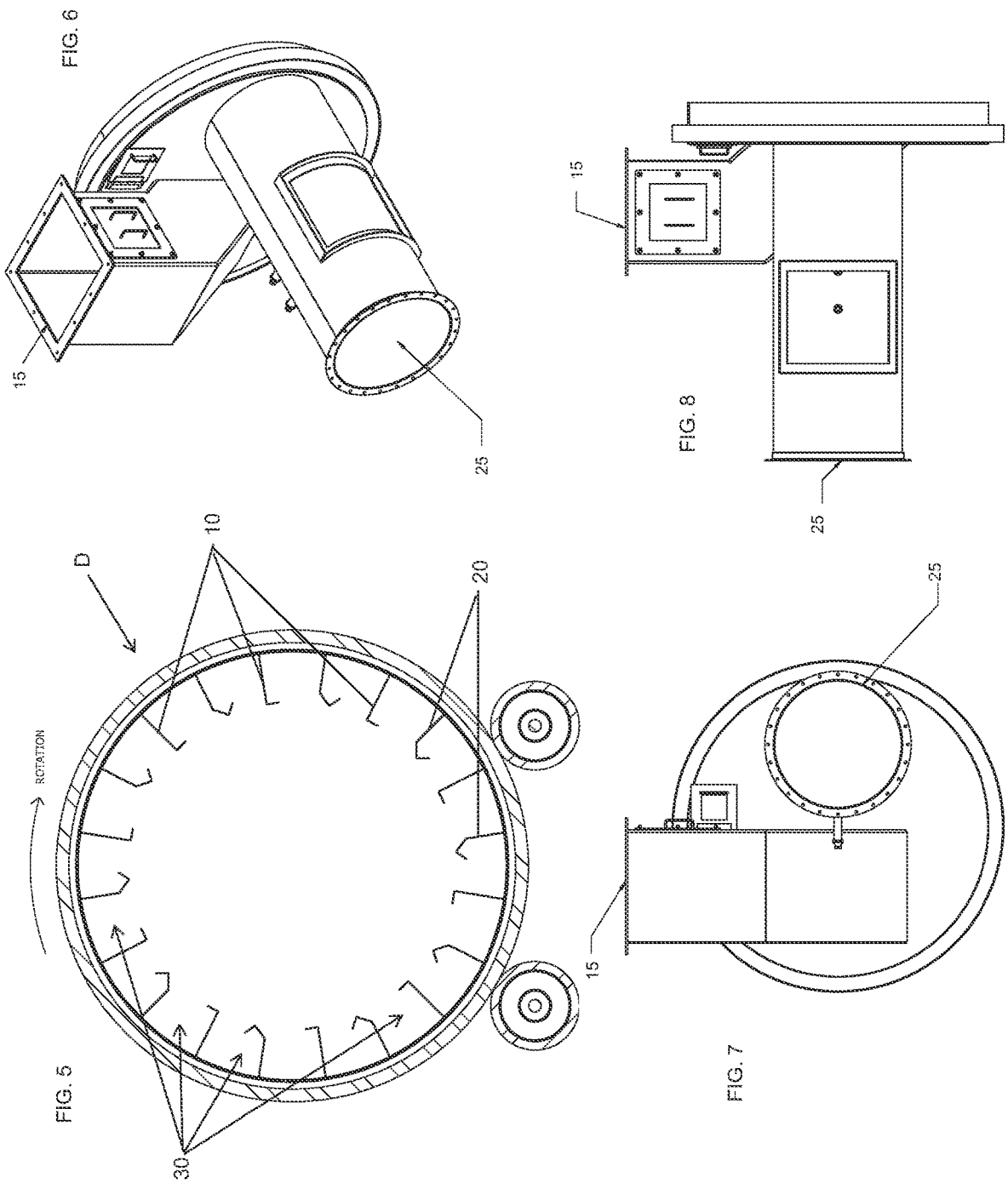

HEMP DRYING PROCESS

FIELD OF THE INVENTION

The invention relates to methods of drying hemp plants, and in particular to methods of drying hemp plants that preserve the cannabidiol contained within the plants.

DISCUSSION OF PRIOR ART

Hemp plants are stout plants having slender cane-like stalks with leaves having a palmate shape and buds that grow into small greenish yellow flowers that produce seeds or pollen if allowed to grow, and that may grow up to 16 feet in height. The stalks are relatively dense and contain a large percentage of water relative to the other parts of the plant as well as relative to other types of agricultural products such as wheat and corn.

Hemp plants are cultivated and harvested for a number of purposes. For example, fibers from the stalks are used to make varying types of cordage. The seeds are editable and are rich in protein, fiber and magnesium, and may be eaten on their own, incorporated into other food dishes or, for example, used to make an alternative to dairy milk. One more recent trend has been to harvest hemp plants for the cannabidiol ("CBD") contained within the buds of the plants, which presents new complications that largely arise for the manner in which hemp plants are harvested, stored, and processed.

The nature of cultivating, harvesting, and processing agricultural products, generally, is known to present challenges, namely in the fact that not all harvested products may be immediately processed. As a result, the agricultural products must be stored, and stored in a manner that does not allow the products to deteriorate by, for example, molding and decaying. The most common method to preserve such agricultural products is to dry them.

Similarly, once hemp plants have been harvested for CBD extraction purposes they must be dried so that they may be preserved and processed, as the high moisture content in the plant causes them to mold and decay quickly. In general, a typical fresh-cut hemp plant has a moisture content in the range of approximately 60% to approximately 80%, and that content needs to be reduced to approximately 10% to preserve the plant for processing. However, drying hemp in a manner that does not destroy the CBD is particularly challenging as the degree of heat required to sufficiently dry the stalks also tends to destroy the CBD in the buds.

Generally speaking, there are many known devices and methods for drying agricultural materials that contain moisture. For example, rotary dryers are industrial size dryers that include large rotating drums that are contained within cylindrical tubes. More particularly, a rotary dryer comprises a rotary drum disposed for rotation about a horizontal axis and a carrier gas circulation system for the drum. The size of the dryers vary, but in general the length of the tube is approximately 4 to 5 times the diameter of the tube. For example, dryers are known for having a length of 35 feet and a diameter of 9 feet, or a length of 45 feet and a diameter of 10 feet. One end of the rotary drum has at least one inlet for the materials that are to be dried and for the heat, which is provided by a furnace. As the hot air and materials are input into the rotary drum the rotates, typically at a rate of 8 to 15 rotations per minutes, which collectively cause a gas movement rate of roughly 600-1000 feet per minute. The speed of the rotary drum keeps the materials moving throughout the drum, and if the drum rotates too slowly materials frequently stay on the sides, or walls, of the dryer drum and eventually clog the drum to the point where it becomes inoperable.

Bulk solids, such as agricultural products, are dried in the rotary drum by heat exchange between products and the carrier gas being circulated in direct or indirect contact with the solids. The interior surface of the drums include some form of flights or fins that lift the material as the drum rotates inside the cylinder. As the drum rotates and the gas circulates the materials within the drum move from an entry point on one end to an exit point at the other end. The drying process varies based on the time spent in the dryer and the inlet temperature of the dryer.

While the general concept of a rotary drum is known, and known to be effective with many types of agricultural materials, it is generally a poor fit for drying hemp for CBD extraction purposes due to the extremely high moisture content of the stalks and comparatively low moisture content of the buds in conjunction with the heat sensitivity of the CBD within the buds. In other words, in order to sufficiently dry the stalks the CBD is often damaged or destroyed by the high level of heat. The stalks themselves also tend to collapse within the conventional rotary dryer causing the interior of the stalks to form massive "birds' nests" like structures within the dryer, which is an extreme fire hazard inside the dryer.

Conventional rotary dryers commonly operate with inlet temperatures above 850 degrees Fahrenheit and typically around 1000 degrees Fahrenheit, with the hot air being introduced directly into the dryer at the same entry point as the bulk materials being dried, the hot air and bulk materials sharing the same inlet. Once the hot air enters the drum the temperature drops considerably as the air moves out of the furnace and into the drum and continues to decrease in temperature as it is pushed through the drum, however, while it drops form the initial level of, for example, 1000 degrees, it still maintains a high level of heat relative to normal temperatures and, in the case of a 1000 degree entry level the dryer may still maintain temperatures over 500 degrees through the time in the drum.

CBD has a boiling point of approximately 320 degrees Fahrenheit, and as a result the CBD within the hemp plant is typically destroyed at temperatures between 325 and 365 degrees Fahrenheit. If the hemp material is placed in the air stream of the hot air being introduced into a conventional rotary dryer it typically "flash" dries and the CBD is destroyed. Additionally, once the hemp is in the drum in a conventional system, regardless of how or where it is introduced, it is still exposed to the airstream and subjected to temperatures that, over the course of time the hemp is in the drum, still cause the CBD to decay and/or be destroyed.

What is needed, therefore, is a method of drying hemp that allows for large amounts of hemp to be dried in a manner that does not destroy the CBD within the plant.

BRIEF SUMMARY OF THE INVENTION

The invention is method of drying hemp that is a two-stage process using, generally, a lower than average inlet temperature, an offset inlet design, and a specific flight design. Hemp plants are first chopped or cut into relatively small segments, generally including a section of the stalk that ranges in length from between 2 and 4 inches (the width of the plant is typically sufficient for during purposes). A bulk amount of chopped hemp is then placed in and run through a relatively conventional rotary dryer with a relatively low inlet temperature, typically around 700 degrees Fahrenheit.

When the chopped hemp is initially placed in the dryer it typically has a moisture content of roughly 60% to 80%. Upon exiting the dryer following the first pass the moisture content is typically reduced to something in the 35-40% range. Once a first set of bulk material has passed through the dryer it is collected and placed back in the dryer for a second pass. Upon exiting the dryer for a second time the moisture content is reduced to approximately 10% and the CBD within the buds is still viable.

The rotary dryer system is conventional except for the hot air inlet and material inlet design and a unique flight design. For example, the rotary drying system may be a modification to a 25 million British thermal unit per hour (25 MM BTU/hr) rotary drying system from Player Design, Inc., which is capable of consistently generating heat in the area of 700 to 1000 degrees Fahrenheit while being fed numerous forms of wood and wood byproduct. The modifications, in this instance, include an alteration to the location of the hot air inlet and the flight design inside of the dryer drum. Specifically, the hot air inlet is offset from the bulk material inlet such that the bulk material that's being added to the dryer does not come within the direct path of the hot air for the hot air inlet. The flight design creates a number of pockets that causes moist chopped hemp to fall into and be held by these pockets until they are dried enough to start flaking or breaking apart. As a result of this design, the temperature within the drum drops extensively due to the expansion for the inlet duct to the drum, generally causing the temperature within the drum to drop below the temperature range for damaging the CBD.

As the hemp plant parts are deposited into the drum they are generally caught by the flights. As the drums rotates and the hemp parts work their way through the drum the various parts of the hemp plants start to dry, some faster than others, and as the parts dry they break off and pass through the dryer more quickly than the more moist parts and as a result the these dried parts of the plant do not remain in the dryer and burn or suffer any significant deterioration due to excess heating and drying. More specifically, the flight design creates a plurality of pockets around the interior perimeter of the drum with an alternating pattern of approximately 90 degree flights with approximately 45 degree return flights.

In general, the combination of dryer system and method of use dries the hemp while preserving the CBD.

BRIEF DESCRIPTION OF THE DRAWINGS

The present invention is described with reference to the accompanying drawings. In the drawings, like reference numbers indicate identical or functionally similar elements. The drawings are not drawn to scale.

FIG. 2 is perspective view of a rotary drum for use in a rotary drying system for practicing the method.

FIG. 3 is a right side view of a rotary drum for use in a rotary drying system for practicing the method.

FIG. 4 is a left side view of a rotary drum for use in a rotary drying system for practicing the method.

FIG. 5 an end view of a rotary drum as used in the process according to the invention showing the flight design.

FIG. 6 is a perspective view of an end of the rotary drum showing the inlets.

FIG. 7 is an end view of the dryer drum showing the offset material inlet and hot air inlet.

FIG. 8 is a side view of the dryer drum showing the offset material inlet and hot air inlet.

DETAILED DESCRIPTION OF THE INVENTION

Figure 1:
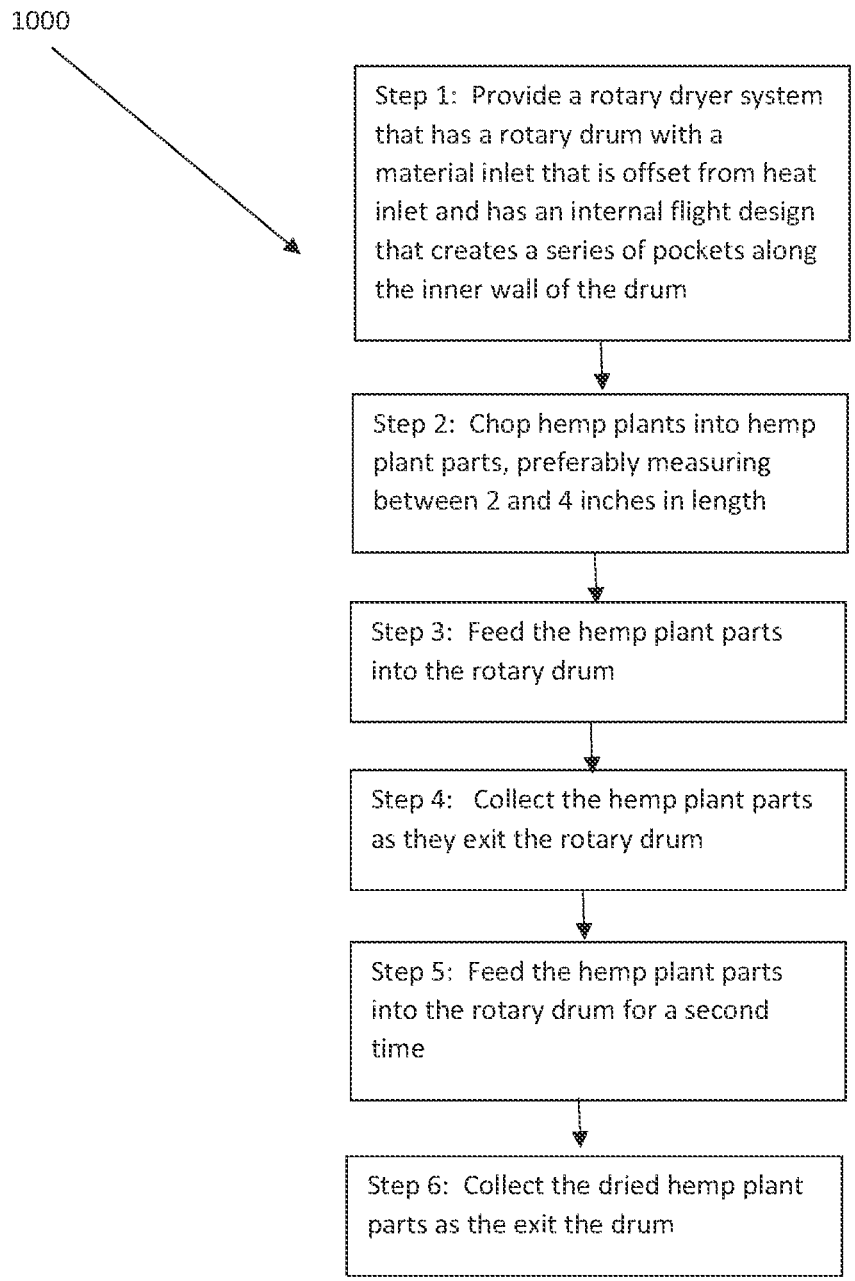
FIG. 1 is a flow chart that illustrates the steps in the method.

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

FIG. 1 illustrates a method 1000 of drying hemp according to the invention using a rotary dryer system 100 that is able to dry the hemp plants moisture-dense stalk without damaging the cannabidiol ("CBD") in the hemp plants less-moisture dense buds. The method generally involves the following steps: 1) provide a rotary dryer system having a rotary drum in which the hot air inlet is offset from the material inlet and wherein the flight design creates a number of pockets; 2) chop hemp plants into hemp plant parts, preferably measuring between 2 and 4 inches in length and generally without modifying the width; 3) feed the hemp plant parts into the rotary drum and run them through the rotary drum until all hemp plant parts exit the rotary drum; 4) collect the hemp plant parts as they exit the rotary drum; 5) feed the once-dried hemp plant parts back into the rotary drum and run them through the rotary drum for a second time; 6) collect the dried hemp plant parts.

FIGS. 2-8 illustrate a modified rotary drum 100 for use with a rotary dryer system in practicing the method 1000. The rotary dryer system is a modification of a conventional dryer system such as, for example, a 25 million British thermal unit per hour (25 MM BTU/hr) rotary drying system from Player Design, Inc. The conventional rotary drying system has a furnace that produces high levels of heat that is fed in to the rotary drum 100 via a hot are inlet 25. This conventional rotary drying system is modified in at least three important manners, all of which relate to the rotary drum 100.

First, the hot air inlet 25 is smaller than the conventional inlet and has a diameter that is approximately 20%-30% as wide as that of the drum itself. For example, the hot air inlet duct 25 may have a diameter of 2 feet to 3 feet while the diameter of the drum is between 9 feet and 10 feet. Second, the material inlet 15, which may also have a diameter of 2 feet to 3 feet on a drum having a 9 foot to 10 foot diameter, is offset from the hot air inlet 25. The offset is of critical importance as it prevents flash drying of the materials, however, the offset need not to be that great of a distance. For example, the two inlets 15, 25, may be placed nearly side by side, separated by only a few inches.

Finally, the rotary drum 100 has a flight design that includes segmented flights arranged in a radial pattern around an interior perimeter of the drum with an alternating pattern of 90 degree flights 10 with 45 degree return flights 20 that creates a plurality of pockets 30 around the perimeter of the drum.

The specific size of the dryer drum 100 may vary, however, having a drum that is approximately 45 feet in length with a diameter of approximately 10 feet is particularly advantageous. Similarly, while various operating parameters may also be sufficient, having a relatively low inlet temperature of approximately between 650 degrees Fahrenheit and 750 degrees Fahrenheit, and preferably around approximately 700 degrees Fahrenheit, is particularly advantageous. Aside from these features, the rotary dryer system may be any conventional rotary dryer system.

As noted, the method is a two-stage process whereby the chopped plant parts are passed through the dryer twice. First, a bulk amount of relatively-fresh cut hemp is chopped into a plurality of pieces measuring in length between approximately 2 and 4 inches in length is placed in the dryer. In general, freshly harvested and chopped hemp plants have stalks that contain approximately 60-80% moisture, and that moisture level needs to be reduced to approximately 10% in order to be effectively preserved for subsequent processing.

Using this example, a first pass through the rotary drum 100 reduces the moisture in the plants to approximately 35%-40% while keeping the temperature inside the rotary drum 100 at a level below the boiling point of the CBD and typically below 300 degrees Fahrenheit. In general, with the aforementioned design and operational parameters the temperature of the hemp plant parts does not exceed 150 degree Fahrenheit while inside of the rotary drum 100.

The rotary drum 100 may be continually fed chopped hemp plants for varying amounts of time, for example, approximately one hour, during which the partially dried materials that exit the drum 100 through a single hot air and material out 35, cool, and are collected. The chopped parts may be fed into the inlet in a conventional manner as prescribed by the particular rotary drum and rotary drying system, with the amount of parts and the speed at which the parts are deposited determined by particular operating parameters of the given rotary drying system. Using the aforementioned example dryer system, the drum may be fed approximately 10 tons of chopped hemp plants per hour. Once the first batch has passed through the drum it is collected using conventional means, including any suitably sized container and/or conveyor system, and the hemp plants parts are fed back in through the drum's material inlet in a conventional manner and sent through the drum again. It is advantageous if the material that was dried first is sent back through the drum first as it has had an amount of time to cool, which lessens the likelihood of overheating or burning upon the second pass. In general, the bulk materials have a moisture content in the 8%-10% range following the second pass through the dryer.

The aforementioned flight design allows hemp plants to rotate in the drum in a manner that precludes damage to the CBD contained within the plants. As the hemp plants start to dry the leafy portions break free around the flights and fall out of the dryer, while the dense parts that contain more moisture and require more drying time remain in the drum for a longer duration and continue to dry.

An additional benefit of the method is that the drying process also destroys any bacteria in or on the plants, thus creating hemp and CBD that is capable of being used in pharmaceuticals.

It is understood that the embodiments described herein are merely illustrative of the present invention. Variations in the drying process may be contemplated by one skilled in the art without limiting the intended scope of the invention herein disclosed and as defined by the following claims.

What is claimed is:

1. A method of drying hemp plants, the method comprising the following steps:
   chopping the hemp plants into hemp plant parts that have a length of less than approximately 4 inches and that have a moisture content of greater than approximately 60%;
   providing a rotary dryer system that includes a rotary drum and that has a first end and a second end, the first end including a material inlet that is offset from a hot air inlet, the hot air inlet configured to supply heated air to the rotary drum;
   the rotary drum having segmented flights arranged in a radial pattern around an interior perimeter of the drum that creates a plurality of pockets around the interior perimeter of the drum, the radial pattern including an alternating pattern of first flights and second flights, each of the first flights having a first segment that extends inward towards a middle of the drum and a second segment that forms an approximately 90 degree angle at the end of the first segment, each of the second flights having a first portion that extends inward towards the middle of the drum, a second portion that forms an approximately 120 degree angle with the first portion, and a third portion that forms approximately 90 degree return angle with the second portion, the third portion pointing towards a side of the rotary drum from which the flight first extends;
   feeding the hemp plant parts into the material inlet and running the rotary dryer system so that the hemp plant parts pass through the rotary drum and exit the drum through an outlet on the second end;
   collecting the hemp plant parts as the hemp plant parts exit the rotary drum as once-dried hemp plant parts; and
   feeding the once-dried hemp plant parts into the rotary drum and running the rotary dryer system to cause the one-dried hemp plant parts to pass through the rotary drum for a second time.

2. The method of claim 1, wherein the hot air inlet has a diameter that is approximately 20% to approximately 30% of a diameter of the rotary drum.

3. The method of claim 1, wherein the rotary dryer system provides hot air to the hot air inlet that has a temperature between approximately 650 degrees Fahrenheit to approximately 700 degrees Fahrenheit.

4. The method of claim 1, wherein the material inlet is adjacent to the hot air inlet on one end of the rotary drum.

5. The method of claim 1, wherein hemp plant parts are fed into the rotary drum for at least one hour before the once-dried hemp plant parts are fed back into the rotary drum.

6. The method of claim 1, wherein the material inlet is offset from the hot air inlet on one end of the rotary drum, the offset being of sufficient distance to ensure that the hemp plant parts entering through the material inlet do not intersect with hot air entering through the hot air inlet.

* * * * *